(12) United States Patent
Miwa et al.

(10) Patent No.: US 7,592,779 B2
(45) Date of Patent: Sep. 22, 2009

(54) CHARGING DEVICE

(75) Inventors: Tatsuya Miwa, Osaka (JP); Atsumasa Kubota, Osaka (JP); Naoki Shimizu, Osaka (JP); Masaki Ikeda, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 364 days.

(21) Appl. No.: 11/387,914

(22) Filed: Mar. 24, 2006

(65) Prior Publication Data

US 2006/0214639 A1 Sep. 28, 2006

(30) Foreign Application Priority Data

Mar. 28, 2005 (JP) ............................. 2005-093153

(51) Int. Cl.
*H02J 7/04* (2006.01)
(52) U.S. Cl. ...................................... 320/150; 320/144
(58) Field of Classification Search ................. 320/134, 320/128, 144, 150, 153
See application file for complete search history.

(56) References Cited

U.S. PATENT DOCUMENTS

| 5,497,068 | A | * | 3/1996 | Shiojima | 320/150 |
| 5,519,302 | A | * | 5/1996 | Mino et al. | 320/148 |
| 5,627,451 | A | * | 5/1997 | Takeda | 320/151 |
| 5,825,159 | A | * | 10/1998 | Patino | 320/125 |
| 6,204,639 | B1 | * | 3/2001 | Takano et al. | 320/150 |
| 7,285,936 | B2 | * | 10/2007 | Ohnuma et al. | 320/150 |

* cited by examiner

*Primary Examiner*—Akm E Ullah
*Assistant Examiner*—Nguyen Tran
(74) *Attorney, Agent, or Firm*—Bacon & Thomas PLLC

(57) ABSTRACT

A charging device includes a charging unit; a detection unit for detecting a temperature and a temperature increasing rate of a rechargeable battery; a controller for controlling the charging unit to supply a charging current to the rechargeable battery; and a compensating unit for setting a value of the first threshold to be greater if the temperature of the rechargeable battery at the time of mounting the rechargeable battery on the charging device is equal to or smaller than a second threshold and smaller if otherwise. The charging unit stops supplying the charging current to the rechargeable battery if the temperature increasing rate is equal to or greater than a first threshold.

7 Claims, 12 Drawing Sheets

CHARGING DEVICE

FIELD OF THE INVENTION

The present invention relates to a charging device for charging a rechargeable battery; and more specifically, to a method for controlling a charging operation thereof at a low temperature.

BACKGROUND OF THE INVENTION

Conventionally, a battery pack having a rechargeable battery provided with a temperature detecting unit for detecting a temperature of the rechargeable battery has been used in a power tool or the like. The battery pack is independently formed of a tool's body and can be separated from the tool's body to be mounted on a charging device during the charging operation. As shown in FIG. 10, as the charging operation comes to an end thereof, a temperature increasing rate ($\Delta T/\Delta t$) of the rechargeable battery detected by the temperature detecting unit increases substantially. Based on this principle, and responsive to a detection result of the temperature detecting unit, a controller determines that a full capacity charge of the rechargeable battery has been reached when the temperature increasing rate ($\Delta T/\Delta t$) is equal to or greater than a first predetermined value and stops the charging operation accordingly.

It is known that a carrying out of the charging operation of the battery pact at a low temperature may result in shortening of the life time thereof. In view of this, there is known a charging device of a type that, at a low temperature of, e.g., not greater than 0° C., even though a battery pack is set on a charging device, the charging device does not carry out a normal charging operation and, instead, enters into a low temperature standby mode in which the battery pack is supplied with a minimal or no electric current. Also known is a charging device of a type that, even when a charging operation is in progress, the charging operation is switched into a low temperature standby mode if the temperature of the battery reaches a low temperature as noted above. Thereafter, the charging operation is restarted when the temperature of the rechargeable battery reaches, e.g., 5° C.

Even in the battery pack protected with the low temperature standby mode, however, a normal mode charging operation proceeds as the temperature to which the battery pack is exposed is increased. For this reason, in the event that the battery pack, which was left alone at a cold outdoor environment of equal to or colder than –10° C., is brought into a room of about 30° C. and then set on a charging device, the temperature increasing rate becomes substantial due to the difference between the outdoor temperature and the room temperature. As a consequence, notwithstanding the fact that the charging operation has not yet been completed, a misjudgment is made that the charging operation has been completed as illustrated in FIG. 11, thus resulting in a poor charging problem referred to as "premature charging cessation".

Japanese Patent Laid-open Publication No. H6-141481 discloses a prior art for avoiding such a poor charging problem. In accordance with this prior art, a temperature increasing rate is not detected for a time period corresponding to the temperature of the rechargeable battery at the time of initiating the charging operation. This helps not only to avoid the poor charging problem but also to prevent the time for starting the detection of the temperature increasing rate from being prolonged unwantedly.

The prior art cited above is effective in avoiding the premature charging cessation and charging the rechargeable battery up to a somewhat acceptable capacity level. However, the rechargeable battery thus provided exhibits different performance depending on its condition of use and shows a marked reduction in performance at a low temperature. Although the prior art does not detects the temperature increasing rate in consideration of the time corresponding to the temperature of the rechargeable battery, there still exists a possibility that the rechargeable battery cannot be fully charged. This is because the determination of completion of the charging operation is made by a threshold value of a predetermined temperature increasing rate.

SUMMARY OF THE INVENTION

It is, therefore, an object of the present invention to provide a charging device capable of fully charging a battery in a reliable manner even when the battery is at a low temperature.

In accordance with the present invention, there is provided a charging device including: a charging unit; a detection unit for detecting a temperature and a temperature increasing rate of a rechargeable battery; a controller for controlling the charging unit to supply a charging current to the rechargeable battery, wherein the charging unit stops supplying the charging current to the rechargeable battery if the temperature increasing rate is equal to or greater than a first threshold; and a compensating unit for setting a value of the first threshold to be greater if the temperature of the rechargeable battery at the time of mounting the rechargeable battery on the charging device is equal to or smaller than a second threshold and smaller if otherwise.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

First Preferred Embodiment

Figure 1:
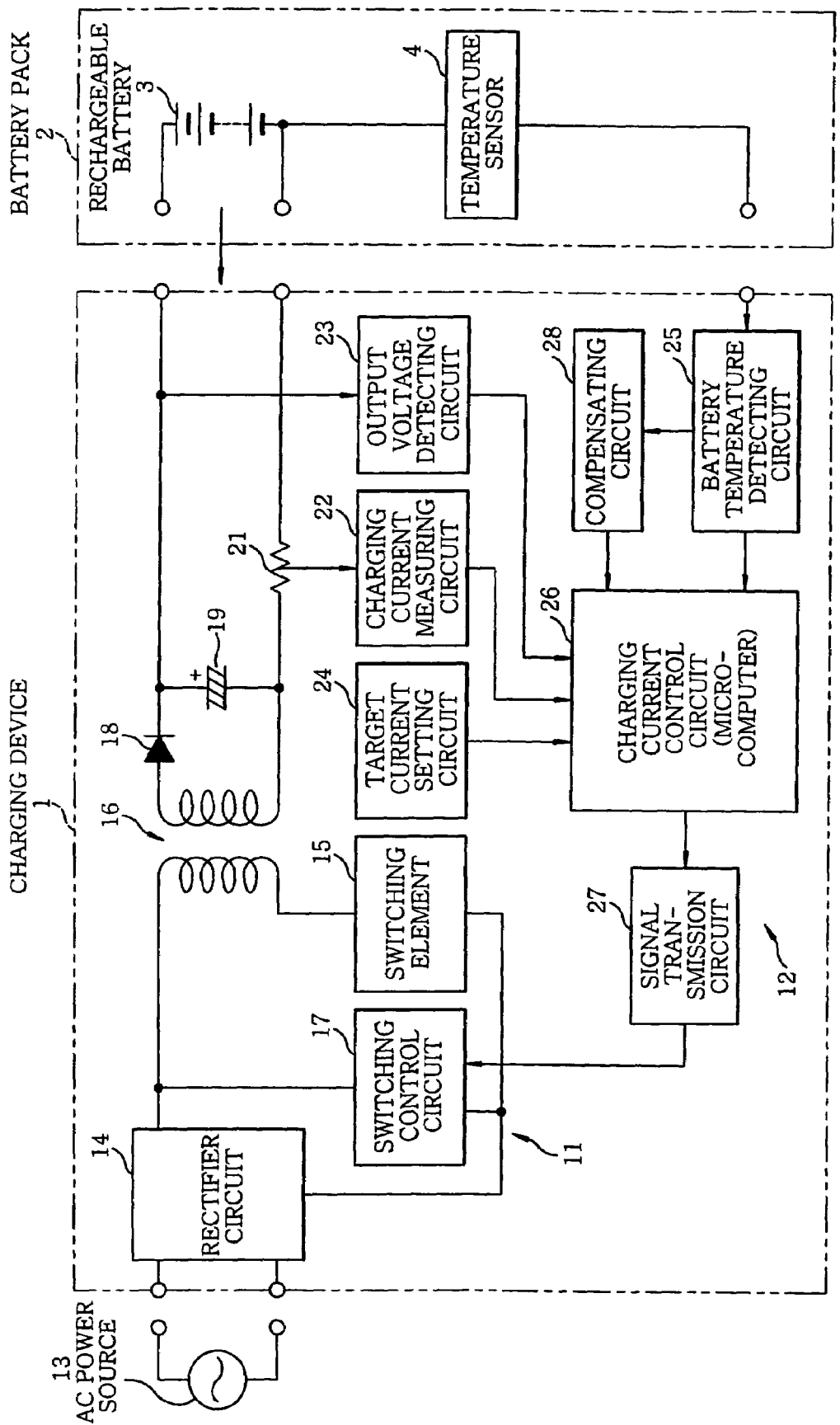
FIG. 1 is a block diagram showing an electrical configuration of a charging device in accordance with a first preferred embodiment of the present invention.

FIG. 1 is a block diagram showing an electrical configuration of a charging device 1 in accordance with a first preferred embodiment of the present invention. The charging device 1 forms a part of, e.g. a rechargeable power tool set. Mounted on the charging device 1 is a battery pack 2 separated from the body of a rechargeable power tool, e.g., a rechargeable drill driver. The charging device 1 serves to charge a rechargeable battery 3 disposed inside the battery pack 2.

Examples of the rechargeable battery 3 include a Ni—Cd (nickel cadmium) battery, a Ni-MH (nickel metal hydride) battery, a lithium-based secondary battery and so forth. Inside the battery pack 2, a temperature sensor 4 is provided in contiguity with the rechargeable battery 3. The temperature sensor 4 is formed of a thermistor or the like and made of different materials depending on the composition and the capacity (rated voltage or rated current) of the rechargeable battery 3, allowing the charging device 1 to sense the type thereof. The temperature sensor 4 has a common ground with the rechargeable battery 3, and the battery pack 2 is connected to the charging device 1 by way of three terminals.

The charging device 1 is generally formed of a power converter circuit 11 and a control circuit 12 thereof. The power converter circuit 11 includes a rectifier circuit 14 for rectifying and smoothening a commercial alternating current supplied from a power source 13 into a direct current; a switching element 15 for switching the direct current; a transformer 16 whose primary coil is connected to the rectifier circuit 14 in series with the switching element 15; a switching control circuit 17 for controlling a switching operation of the switching element 15; and a diode 18 and a smoothing capacitor 19 for rectifying and smoothening a voltage induced at a secondary coil of the transformer 16 to apply the same to the rechargeable battery 3 of the battery pack 2.

The control circuit 12 includes a current-voltage conversion resistor 21 provided on a secondary side of the power converter circuit 11; a charging current measuring circuit 22 for measuring an output current of the power converter circuit 11 from an inter-terminal voltage of the current-voltage conversion resistor 21; an output voltage detecting circuit 23 for measuring an output voltage at the secondary side of the power converter circuit 11; a target current setting circuit 24 for setting a target current during a constant current charging; a battery temperature detecting circuit 25 for measuring a temperature of the rechargeable battery 3 from an inter-terminal resistance value of the temperature sensor 4. The control circuit 12 further includes a charging current control circuit 26, formed of a microcomputer or the like, for operating a control output in response to the input from the circuits 22 through 25; a signal transmission circuit 27 for performing a power amplification of the control output received from the charging current control circuit 26 to apply the amplified control output to the switching control circuit 17 and for controlling the operation of the switching element 15; and a compensating circuit 28 for switching a threshold value for judging whether or not the battery has been fully charged based on the output from the battery temperature detecting circuit 25 in the charging current control circuit 26 in the manner set forth below.

In accordance with the charging device 1 configured as described above, the charging current control circuit 26 serving as a controller controls the supply of a charging current to the rechargeable battery 3 by controlling the operation of the power converter circuit 11 serving as a charging unit by monitoring a temperature increasing rate ($\Delta T/\Delta t$) of the rechargeable battery 3 detected by the battery temperature detecting circuit 25 from the output of the temperature sensor 4 serving as a temperature detecting unit. If the temperature increasing rate ($\Delta T/\Delta t$) becomes equal to or greater than a first predetermined value, i.e., a threshold value for judging of a full capacity charge, the charging current control circuit 26 executes a $\Delta T/\Delta t$-based overcharge control for judging the rechargeable battery 3 to have been fully charged and then stopping the charging operation. The time $\Delta t$ for which the temperature increasing amount $\Delta T$ is measured may be 30 seconds or one minute, for instance.

In accordance with the first preferred embodiment, if the temperature of the rechargeable battery 3 detected by the battery temperature detecting circuit 25 from the temperature sensor 4 at the time of mounting the rechargeable battery 3 on the charging device 1 is equal to or smaller than a second predetermined value (e.g., 0° C.), the operation enters into a low temperature standby mode, in which the charging operation is not performed, and maintains the low temperature standby mode until the temperature of the rechargeable battery becomes equal to or smaller than a third predetermined value (e.g., 5° C.). If the temperature of the rechargeable battery exceeds the third predetermined value, the compensating circuit 28 increases the first predetermined value in the charging current control circuit 26 and causes the charging current control circuit 26 to execute the charging operation (charging mode) At this time, the $\Delta T/\Delta t$-based overcharge control is performed by using the increased first predetermined value. In preparation for this operation, the charging current control circuit 26 has, as the first predetermined value, a normal $\Delta T/\Delta t$ control table (which is used when the temperature of the rechargeable battery at the time of it being mounted exceeds the second predetermined value) as shown in Table 1 and a low temperature $\Delta T/\Delta t$ control table (which is used when the temperature of the rechargeable battery at the time of it being mounted is equal to or smaller than the second predetermined value and then it exceeds the third predetermined value) as shown in Table 2, the low temperature $\Delta T/\Delta t$ control table having values larger than those of the normal $\Delta T/\Delta t$ control table. If the rechargeable battery 3 is judged to be at a low temperature, the compensating circuit 28 switches the normal $\Delta T/\Delta t$ control table into the low temperature $\Delta T/\Delta t$ control table. That is, the charging mode has a normal charging mode (using the normal $\Delta T/\Delta t$ control table as the first predetermined value) and a low temperature charging mode (using the low temperature $\Delta T/\Delta t$ control table as the first predetermined value)

TABLE 1

| Charging | Initial Temperature of Battery Pack | | | Time |
|---|---|---|---|---|
| Mode | ~15° C. | 15~35° C. | 35° C.~ | $\Delta t$ |
| Large Charging Current (8 A, etc.) | 1.8° C. | 1.5° C. | 1.5° C. | 30 sec |
| Middle Charging Current (4 A, etc.) | 2.1° C. | 2.1° C. | 2.1° C. | 60 sec |

TABLE 1-continued

| Charging | Initial Temperature of Battery Pack | | | Time |
|---|---|---|---|---|
| Mode | ~15° C. | 15~35° C. | 35° C.~ | Δt |
| Small Charging Current (2 A, etc.) | 2.5° C. | 2.5° C. | 2.5° C. | 60 sec |

TABLE 2

| Charging | Initial Temperature of Battery Pack | | | Time |
|---|---|---|---|---|
| Mode | ~15° C. | 15~35° C. | 35° C.~ | Δt |
| Large Charging Current (8 A, etc.) | 3.6° C. | 3.6° C. | 3.6° C. | 30 sec |
| Middle Charging Current (4 A, etc.) | 4.2° C. | 4.2° C. | 4.2° C. | 60 sec |
| Small Charging Current (2 A, etc.) | 5.0° C. | 5.0° C. | 5.0° C. | 60 sec |

As described above, the rechargeable battery 3 has a variety of capacities, corresponding to which the ΔT/Δt control tables are set to the normal one and the low temperature one on a basis of the kind of the rechargeable battery 3. Moreover, the ΔT/Δt control tables are set to different values depending on the temperature range at the time of mounting the rechargeable battery 3 on the charging device 1. For example, during the time when an 8A type rechargeable battery of large capacity is charged in the normal charging mode, it is judged that the battery has been fully charged if the temperature increasing amount ΔT reaches up to 1.8° C. or more in case the temperature of the battery pack 2 at the time of being mounted is equal to or smaller than 15° C. for the measuring time Δt of 30 seconds. In contrast, when the low temperature standby mode is switched into the low temperature charging mode, no judgment of the full capacity charge is rendered unless the temperature increasing amount ΔT reaches 3.6° C. or more for the same measuring time Δt of 30 seconds.

For this reason, the temperature sensor 4 is designed to have a thermistor of different length depending on a battery capacity to allow the charging device 1 to recognize the rechargeable battery 3 type at the time of it being mounted. Thus, the temperature sensor 4 and the battery temperature detecting circuit 25 form a battery pack detecting unit that detects the battery pack 2 type being mounted, based on the resistance value of the thermistor. The difference in resistance value between the thermistors selected depending on the battery pack 2 type is sufficiently greater than the resistance variation extent of a specific thermistor over an actual use temperature range such that the battery pack 2 type mounted can be accurately judged at any temperature.

Figure 2:
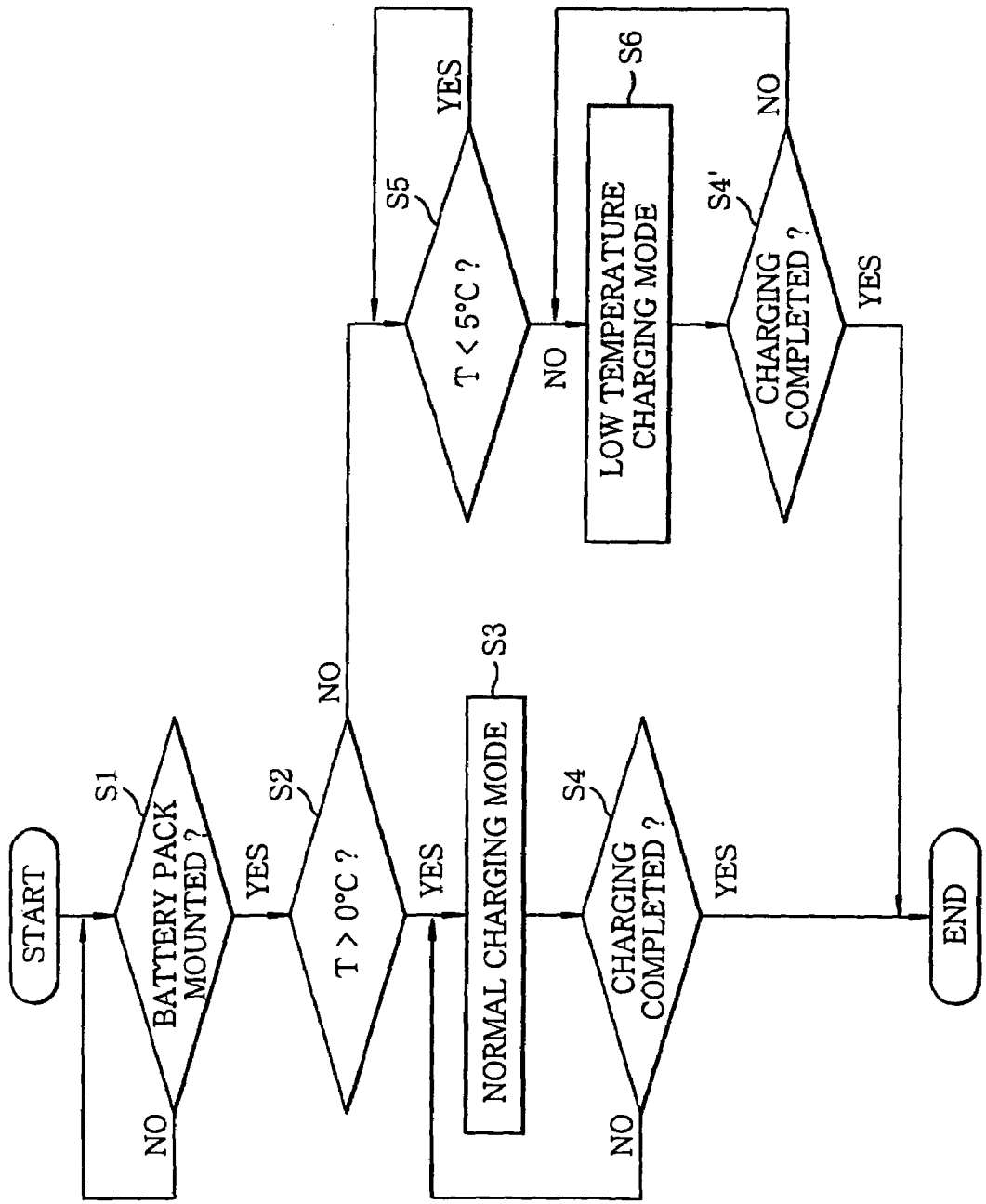
FIG. 2 offers a flowchart for explaining an operation of the charging device shown in accordance with the first preferred embodiment.

FIG. 2 is a flowchart for explaining an operation of the charging device 1 configured as above. At step S1, battery temperature detecting circuit 25 powers on the temperature sensor 4 to determine whether the battery pack 2 is mounted on the charging device 1 or not. Step S1 is repeatedly executed until the battery pack 2 is mounted, and the operation shifts to step S2 once the battery pack 2 is determined to be mounted. At step S2, the temperature T of the battery pack 2 is measured to determine whether it is greater than 0° C. or not. If the temperature T of the battery pack 2 exceeds 0° C., the operation proceeds to step S3 to perform the normal charging mode by using the normal ΔT/Δt control table as illustrated in Table 1. At step S4, it is judged that the full capacity charge has been completed if the temperature increasing rate (ΔT/Δt) is greater than the threshold value of the ΔT/Δt-based overcharge control.

In contrast, if the temperature T of the battery pack 2 is judged to be equal to or smaller than 0° C. at step S2, the operation shifts to step S5, entering into the low temperature standby mode and remaining at the low temperature standby mode until the temperature T of the battery pack 2 reaches above 5° C. If the temperature T of the battery pack 2 exceeds 5° C. at step S6, the operation proceeds to step S6 to perform the low temperature charging mode by using the low temperature ΔT/Δt control table as shown in Table 2. Then, at step S4', it is judged that the full capacity charge has been completed if the temperature increasing rate (ΔT/Δt) becomes larger than the threshold value of the ΔT/Δt-based overcharge control. As described above, by setting the threshold value (e.g., the second predetermined value) at the time of entering the low temperature standby mode to be greater than the threshold value (e.g., the third predetermined value) at the time of switching into the low temperature charging mode, it is possible to prevent the system from entering into the low temperature charging mode prematurely.

Figure 3:
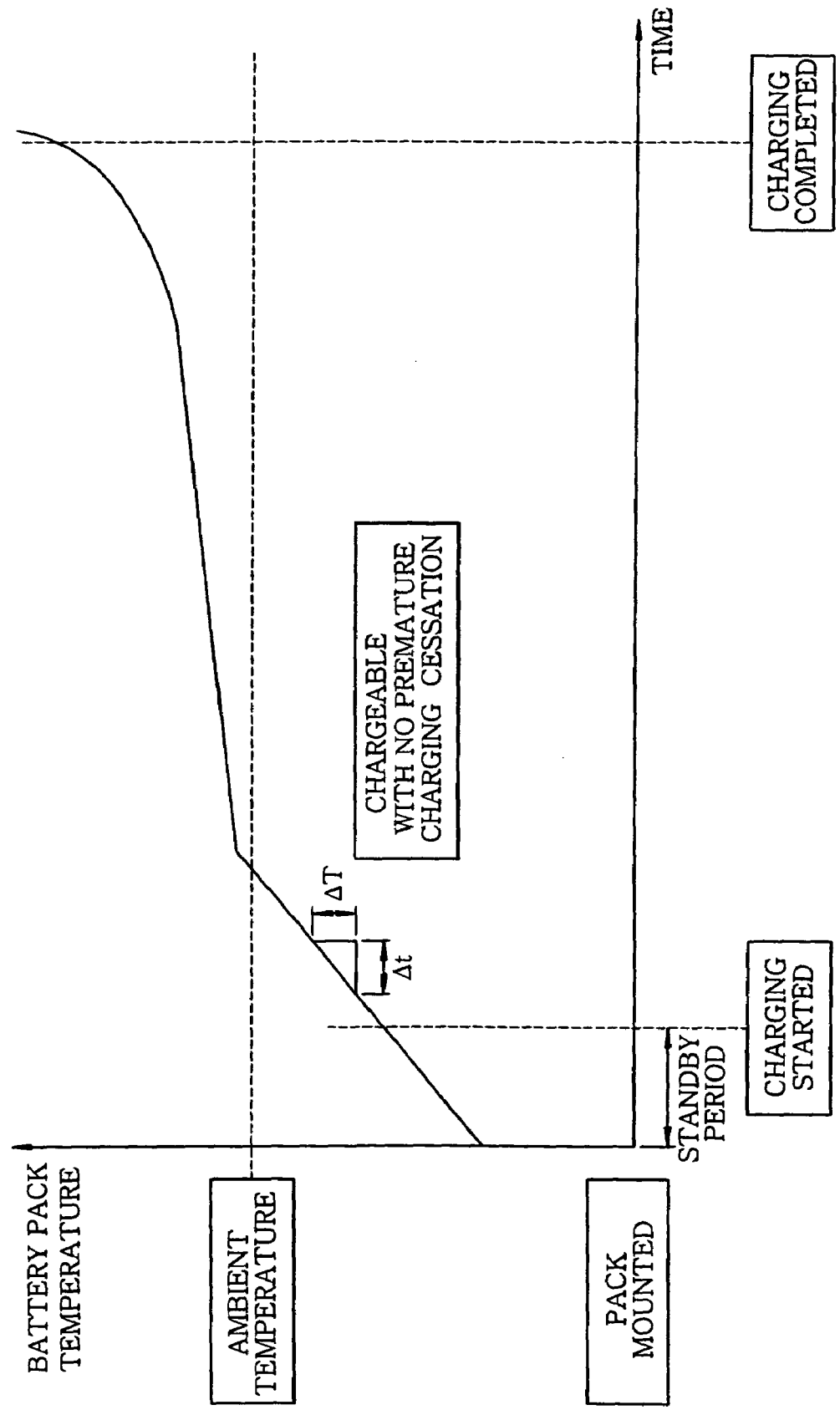
FIG. 3 provides a graph for explaining an operation of the charging device shown in accordance with the first preferred embodiment.

In the charging device 1 having this configuration, as illustrated in FIG. 3, even in the case that the ΔT/Δt-based overcharge control is performed on the rechargeable battery 3 through the switchover from the low temperature standby mode into the low temperature charging mode, the rechargeable battery 3 being relocated from a low temperature environment to a general room temperature environment, it is possible to determine whether or not the rechargeable battery has been successfully charged to its full capacity, to prevent the premature cessation and to charge the battery to its full capacity in a reliable manner as a consequence of the threshold value of ΔT/Δt-based overcharge control during the low temperature charging mode being greatly changed as compared to that of the normal charging mode, resulting in only the temperature increasing amount involved in an intrinsic charging operation obtained being reflected, obtained by excluding the temperature increasing amount due to the temperature difference resulting from the changes in environment.

Further, as described above, the rechargeable battery 3 may be different in the composition, as well as in the capacity such as a rated voltage or rated current. Examples of the rechargeable battery 3 having a different composition include a Ni—Cd (nickel cadmium) battery, a Ni-MH (nickel metal hydride) battery, a lithium-based secondary battery or the like. Taking this into account, the temperature sensor 4 and the battery temperature detecting circuit 25, which serve as the battery pack detecting unit, may be designed to sense the composition of the rechargeable battery 3. In such case, the low temperature ΔT/Δt control table shown in Table 2 is desirably changed to, e.g., a control table as shown in Table 3 below.

TABLE 3

| Kind of Battery Pack | Initial Temperature of Battery Pack | | | | | | Time |
| --- | --- | --- | --- | --- | --- | --- | --- |
| | ~15° C. | | 15~35° C. | | 35° C.~ | | |
| | NiCd | NiMH | NiCd | NiMH | NiCd | NiMH | Δt |
| Large Charging Current (8 A, etc.) | 3.6° C. | 3.8° C. | 3.6° C. | 3.8° C. | 3.6° C. | 3.8° C. | 30 sec |
| Middle Charging Current (4 A, etc.) | 4.2° C. | 4.4° C. | 4.2° C. | 4.4° C. | 4.2° C. | 4.4° C. | 60 sec |
| Small Charging Current (2 A, etc.) | 5.0° C. | 5.2° C. | 5.0° C. | 5.2° C. | 5.0° C. | 5.2° C. | 60 sec |

By changing the ΔT/Δt control table, i.e., the threshold value for judging, depending on the temperature increasing rate which varies with its composition, the capacity and the like factors of the rechargeable battery 3, it becomes possible to suitably charge different types of the battery pack 2 without being excessive or deficient, thus allowing the charging device 1 to be commonly used.

Further, when being returned back from the low temperature standby mode, the ΔT/Δt control table may be changed into other ones depending on the temperature range at the time of mounting and may be variably changed to greater values as the temperature at the time of mounting goes down.

Moreover, the change of the ΔT/Δt control table may be executed for a prescribed period of time from the commencement of the charging operation. Thereafter, the value of the ΔT/Δt control table may be returned to a normal value or changed to a value smaller than the changed value but greater than the normal value. Alternatively, the value of the ΔT/Δt control table may be gradually reduced along with the lapse of time from the commencement of the charging operation or may be variably changed depending on the time range lapsed from the commencement of the charging operation. As a further alternative, the value of the ΔT/Δt control table may be controlled with the increasingly changed value until the temperature of the rechargeable battery 3 goes up to a predetermined temperature and, thereafter, may be returned to the normal value.

Figure 4A:
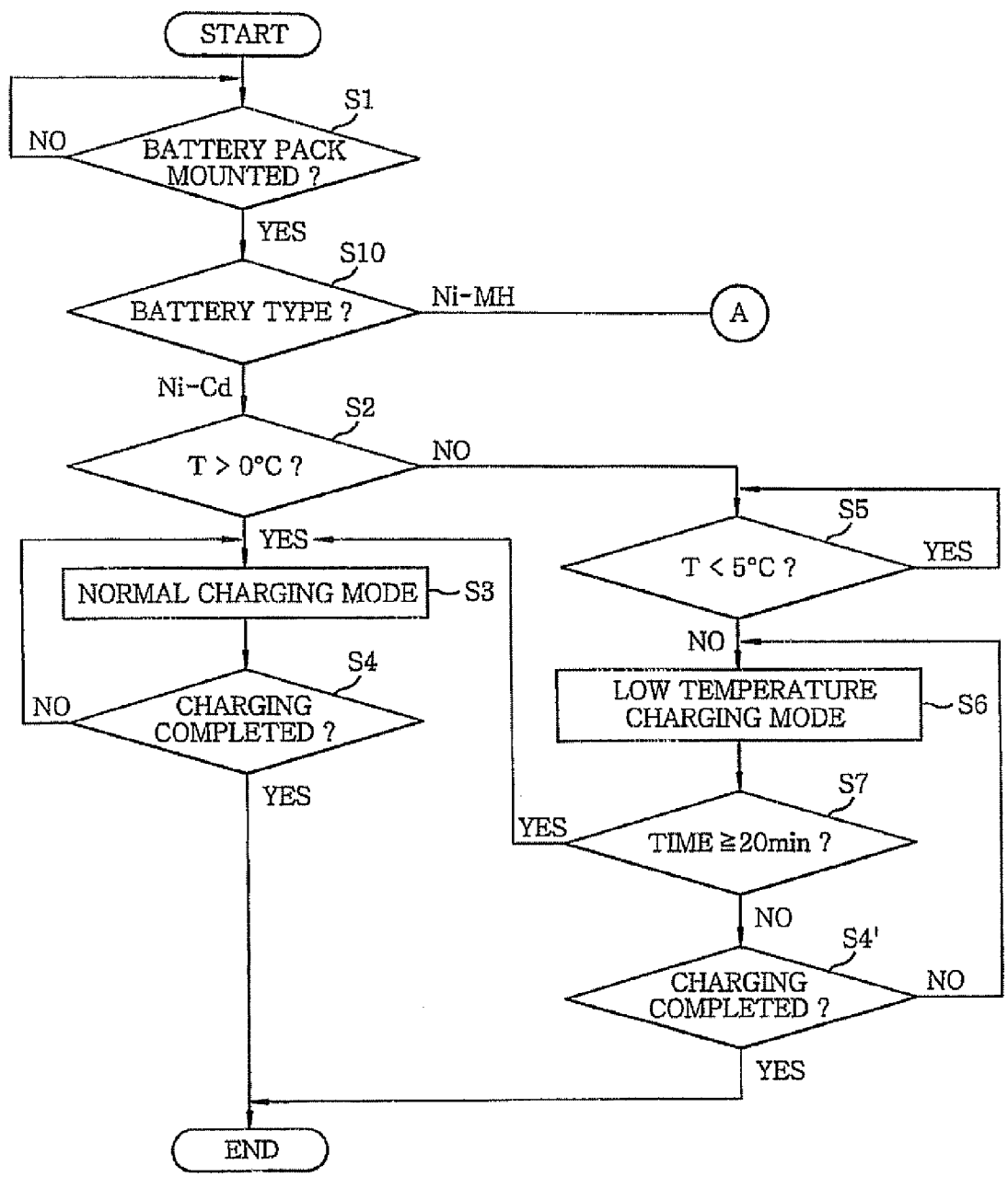
FIGS. 4A and 4B show a flowchart for explaining another operation of the charging device in accordance with the first preferred embodiment.
Figure 4B:
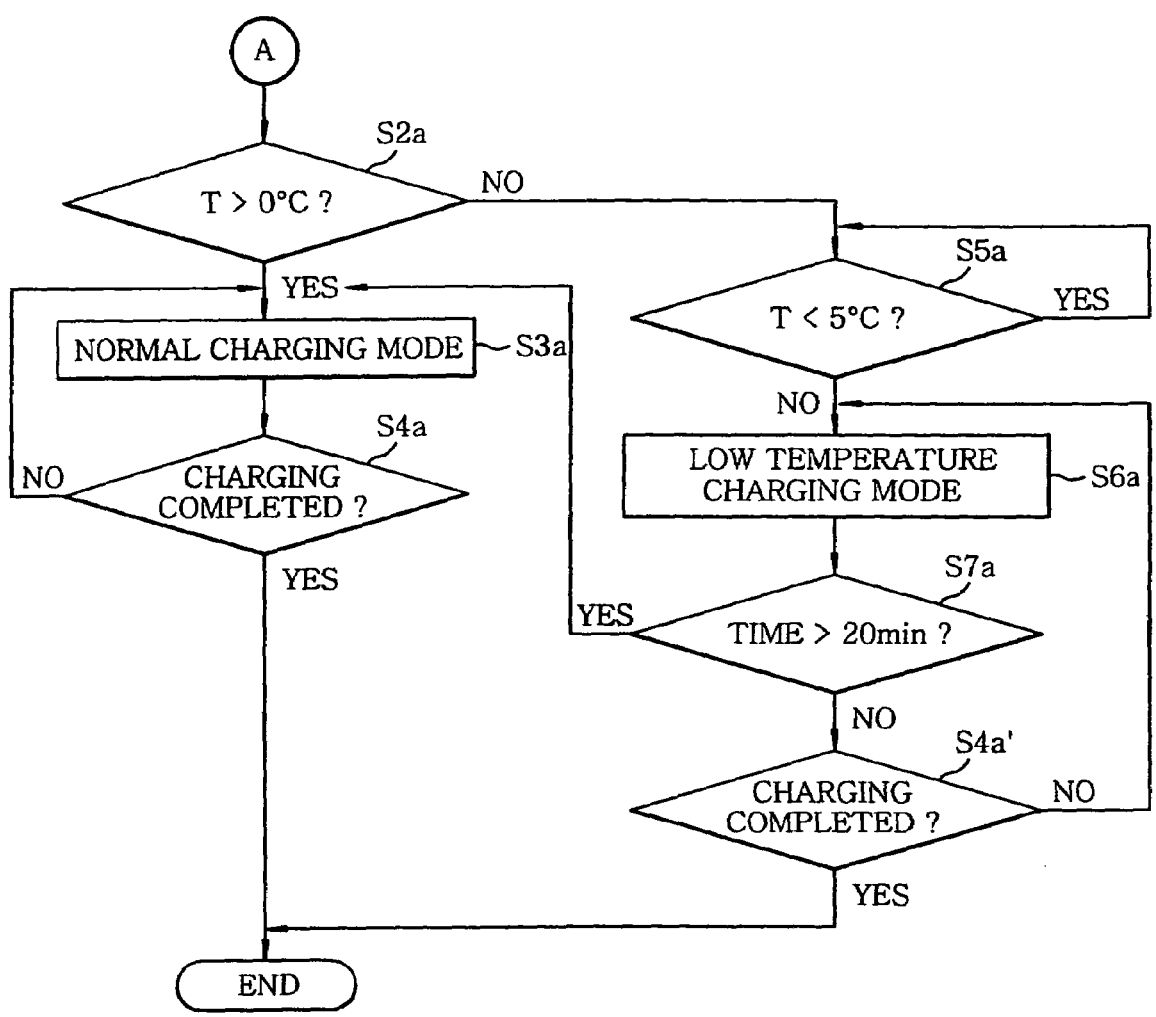

FIGS. 4A and 4B show an example of such operation. Here, operations similar to those designated in the flowchart as shown in FIG. 2 will be assigned same step numbers, and description thereof will be omitted. In the example of FIGS. 4A and 4B, if the mounting of the battery pack 2 is sensed at step S1, then the type of the rechargeable battery 3 in the battery pack 2 is sensed at step S10. In case of the rechargeable battery 3 being a Ni—Cd battery, the operation proceeds to step S2. Then, if the temperature T of the battery pack 2 exceeds 0° C. at step 2, the operation shifts to step 3 to perform the normal charging mode by using the normal ΔT/Δt control table for the Ni—Cd battery as shown in Table 3. At step S4, it is judged that the full capacity charge has been achieved if the temperature increasing rate (ΔT/Δt) becomes larger than the threshold value of the ΔT/Δt-based overcharge control.

In the meantime, if the temperature T of the battery pack 2 is determined to be equal to or smaller than 0° C. at step S2, the operation shifts to step S5 while remaining at the low temperature standby mode until the temperature T of the battery pack 2 reaches above 5° C. When the temperature T exceeds 5° C. at step S5, the operation shifts to step S6 to perform the low temperature charging mode by using the low temperature ΔT/Δt control table for the Ni—Cd battery. Thereafter, it is determined whether or not 20 minutes have lapsed after the low temperature charging mode at step s7 and the rechargeable battery has been fully charged at step s4'. If it is determined that the rechargeable battery has not been fully charged even before 20 minutes have elapsed, the operation shifts to step s6, and if is determined that the full capacity charge has been achieved in 20 minutes, the low temperature charging mode is terminated. At step S7, once 20 minutes have lapsed after the low temperature charging mode, the operation shifts to step S3 to perform the normal charging mode. By regulating the time period during which the charging operation is controlled using the large table value in this embodiment, it is possible to effectively prevent any excess charge.

In case the rechargeable battery 3 is judged to be a Ni-MH battery at step 10, the operation proceeds to steps S2a through S7a, wherein the ΔT/Δt control table for the Ni-MH battery is used to execute the same processes as done at steps S2 through S7.

Further, the change of the ΔT/Δt control table may be performed only for the time interval beginning with commencement of the charging operation and ending with the time by which the battery pack 2 reaches a predetermined temperature. Thereafter, the ΔT/Δt control table may be changed to the normal mode.

Figure 5:
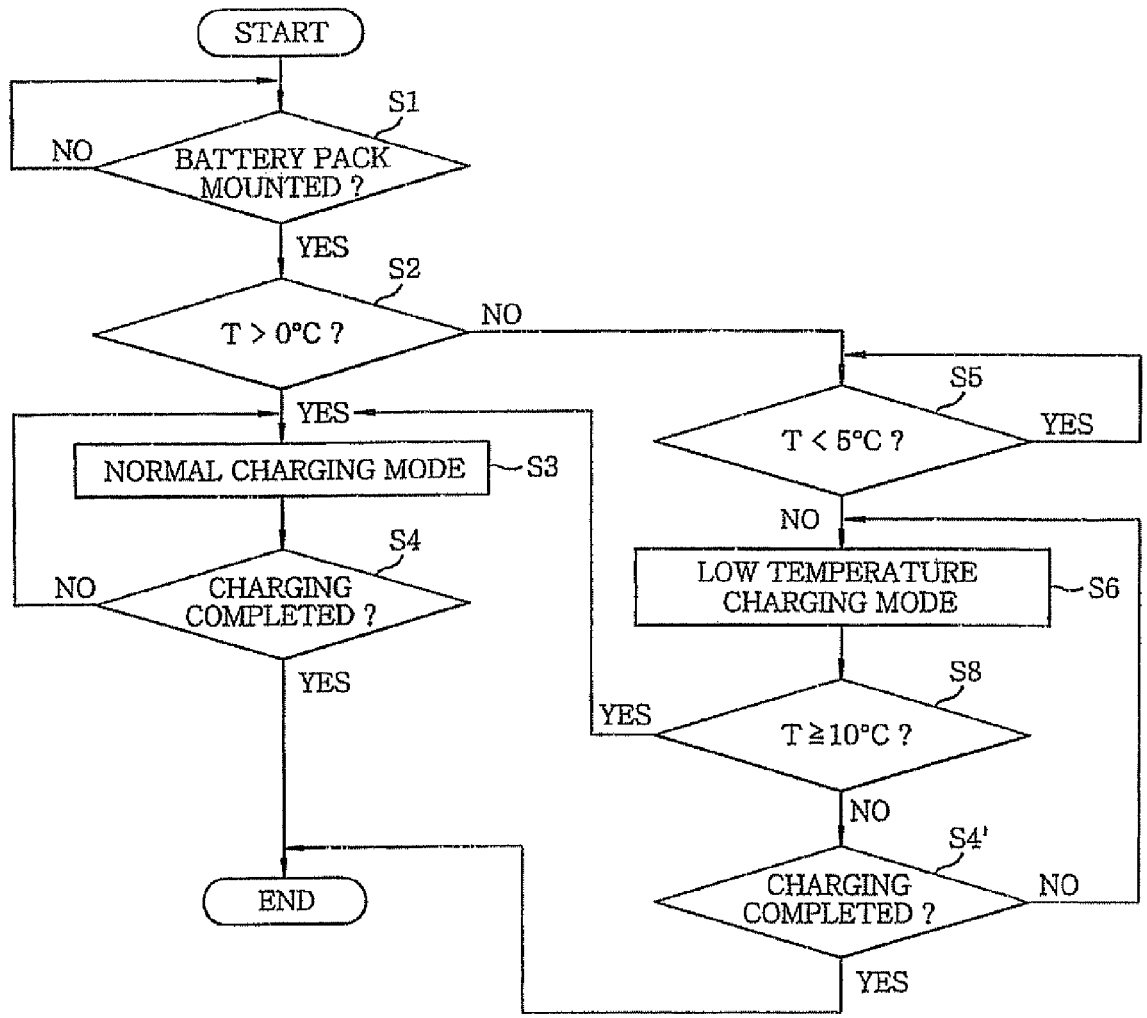
FIG. 5 illustrates a flowchart for explaining still another operation of the charging device in accordance with the first preferred embodiment.

FIG. 5 shows another example of such operation. Here, operations similar to those designated in the flowchart as shown in FIG. 2 will be assigned same step numbers, and description thereof will be omitted. In the example of FIG. 5, if the temperature T exceeds 5° C. at step S5, the flow shifts to step S6 to perform the low temperature charging mode. At step S8, it is determined whether or not the temperature T is equal to or smaller than 10° C. If the temperature is determined to be smaller than 10° C. at step S8, the operation shifts to step S4' at which it is determined whether or not the full capacity charge has been achieved. Then, if it is determined that the full capacity charge has been achieved, the low temperature charging mode is terminated, and if the full capacity charge has been determined to be not achieved, the operation returns back to step S6. At step S8, if the temperature T is equal to or greater than 10° C., the operation shifts to step S3 to perform the normal charging mode by using the normal ΔT/Δt control table. By regulating the time period during which the charging operation is controlled using the large table value in this embodiment, it is possible to effectively prevent any excess charge.

Moreover, the charging operation is started with the low temperature ΔT/Δt control table in the configuration where the charging operation enters the low temperature standby mode when the temperature of the rechargeable battery remains no greater than the second predetermined value. However, in the event that the temperature of the rechargeable battery is decreased to the second predetermined value or less during the charging operation, thereby entering into the low temperature standby mode, and further that the normal mode is subsequently restored from the low temperature standby mode to restart the charging operation, there may be no need to change the first predetermined value.

Figure 6:
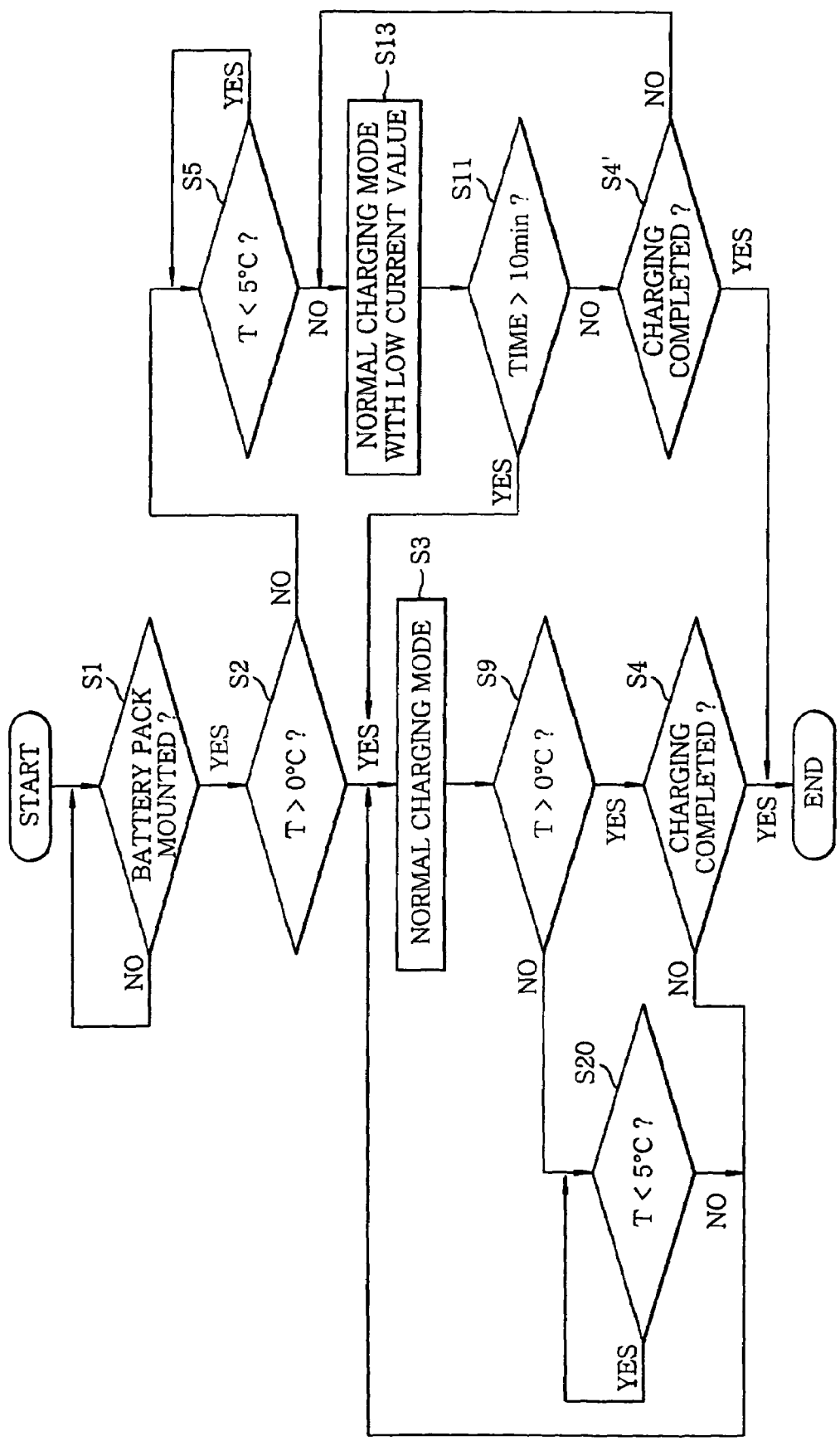
FIG. 6 sets forth a flowchart for explaining still another operation of the charging device shown in accordance with the first preferred embodiment.

FIG. 6 shows still another example of such operation. Here, operations similar to those designated in the flowchart as shown in FIG. 2 will be assigned same step numbers, and description thereof will be omitted. In the example of FIG. 6, if the temperature T of the battery pack 2 is judged to be above 0° C. at step S2, the operation proceeds to step S3 to perform the normal charging mode. Then, at step S9, if the temperature T is equal to or lower than 0° C., the operation shits to step S20 to enter into the low temperature standby mode. At step S20, the low temperature standby mode remains until the temperature T exceeds 5° C. If the temperature T exceeds 5° C., the operation is returned back to step S3 to perform the normal charging mode by using the normal ΔT/Δt control table as shown in Table 1. After starting in the normal charging mode, switching into the low temperature standby mode and then immediately restoring from the low temperature standby mode, it is possible to effectively prevent any excess charge by using the original ΔT/Δt control table.

Furthermore, in the operation of FIG. 6, the operation is shifted from step S2 to step S5 while entering the low temperature standby mode at the time of mounting of the battery pack 2. Thereafter, if the temperature T of the battery pack 2 becomes greater than 5° C., the operation shifts to step S13 to perform the normal charging mode while decreasing the charging current smaller than that of the normal charging mode. Then, it is determined whether or not 10 minutes have lapsed after the low temperature charging mode at step S11, and if 10 minutes have lapsed, the operation shifts to step S3. However, in case 10 minutes have not lapsed at step S11, the charging operation is terminated if it is judged that the full capacity charge has been completed at step S4', but the operation shifts to step S13 if it is judged that the full capacity charge has not been completed.

Second Preferred Embodiment

Figure 7:
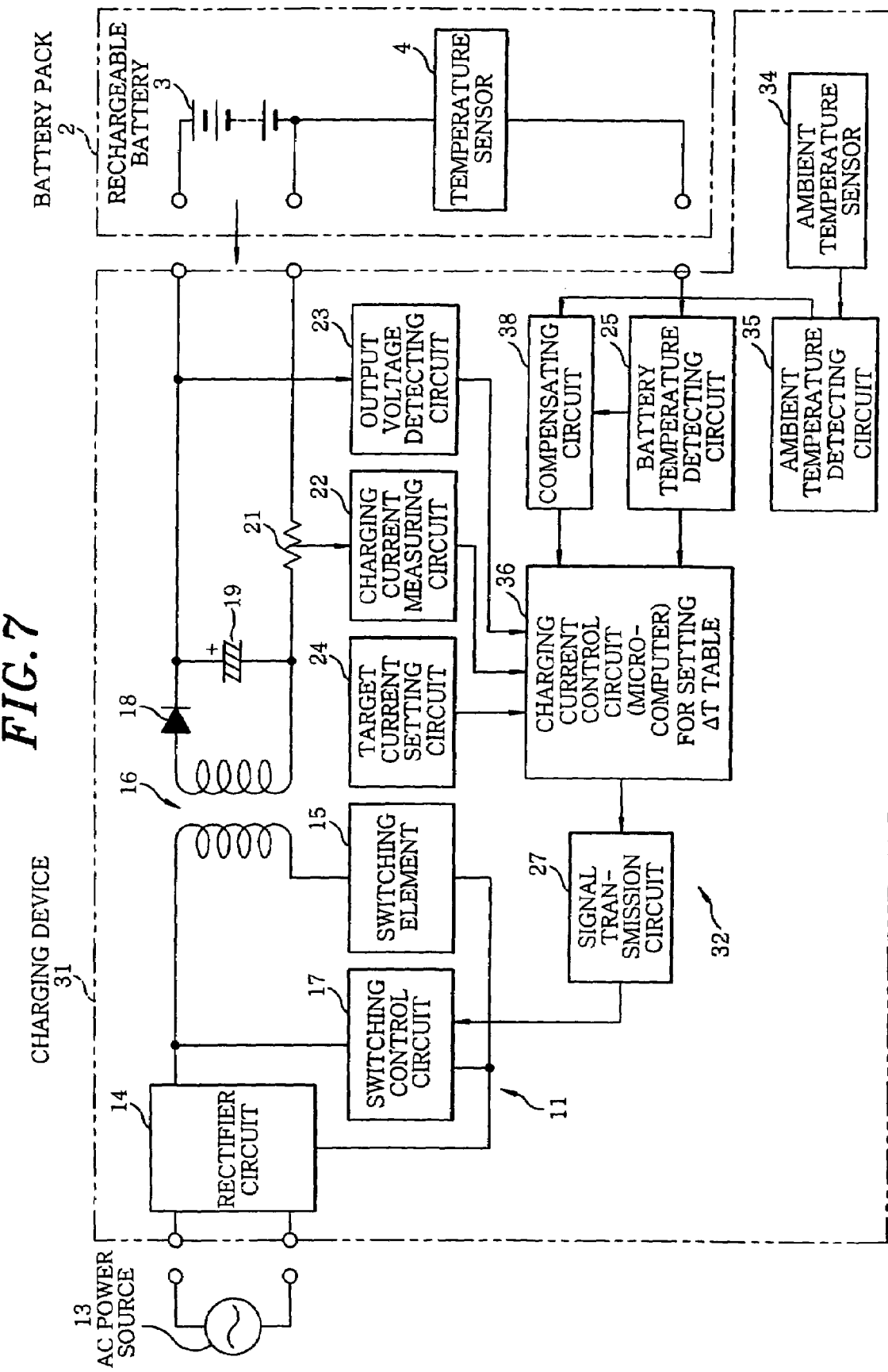
FIG. 7 is a block diagram showing an electrical configuration of a charging device in accordance with a second preferred embodiment of the present invention.

FIG. 7 is a block diagram showing an electrical configuration of the charging device 31 in accordance with a second preferred embodiment of the present invention. The charging device 31 is similar to the aforementioned charging device 1 illustrated in FIG. 1, and hence the parts identical to those described in FIG. 1 will be assigned same reference numerals, and description thereof will be omitted. In accordance with the second preferred embodiment, a control circuit 32 of a charging device 31 includes an ambient temperature sensor 34 formed of a thermistor or the like and an ambient temperature detecting circuit 35 responsive to the output of the ambient temperature sensor 34 for detecting the ambient temperature. A compensating circuit 38 changes the ΔT/Δt control table in the charging current control circuit 36 to, e.g., a table as shown in Table 4 below, corresponding to the difference between the ambient temperature and the temperature of the rechargeable battery 3. The ambient temperature sensor 34 and the ambient temperature detecting circuit 35 cooperate to form an ambient temperature detecting unit.

TABLE 4

| Charging Mode | Difference between Battery Pack Temperature and Ambient Temperature | | | Time |
| --- | --- | --- | --- | --- |
|  | ~10° C. | 10~30° C. | 30° C.~ | Δt |
| Large Charging Current (8 A, etc.) | 1.8° C. | 3.0° C. | 3.6° C. | 30 sec |
| Middle Charging Current (4 A, etc.) | 2.1° C. | 3.5° C. | 4.2° C. | 60 sec |
| Small Charging Current (2 A, etc.) | 2.5° C. | 4.0° C. | 5.0° C. | 60 sec |

Further, in accordance with the second preferred embodiment of the present invention, the compensating circuit 38 allows the ambient temperature sensor 34 to detect the ambient temperature, while the charging operation is in progress, for a predetermined time period, e.g., about 20 minutes, after being switched into the normal mode from the low temperature standby mode. In response to the difference between the ambient temperature and the temperature of the rechargeable battery 3 detected by the battery temperature sensor 4, the compensating circuit 38 changes the ΔT/Δt control table on a step-by-step basis.

Figure 8:
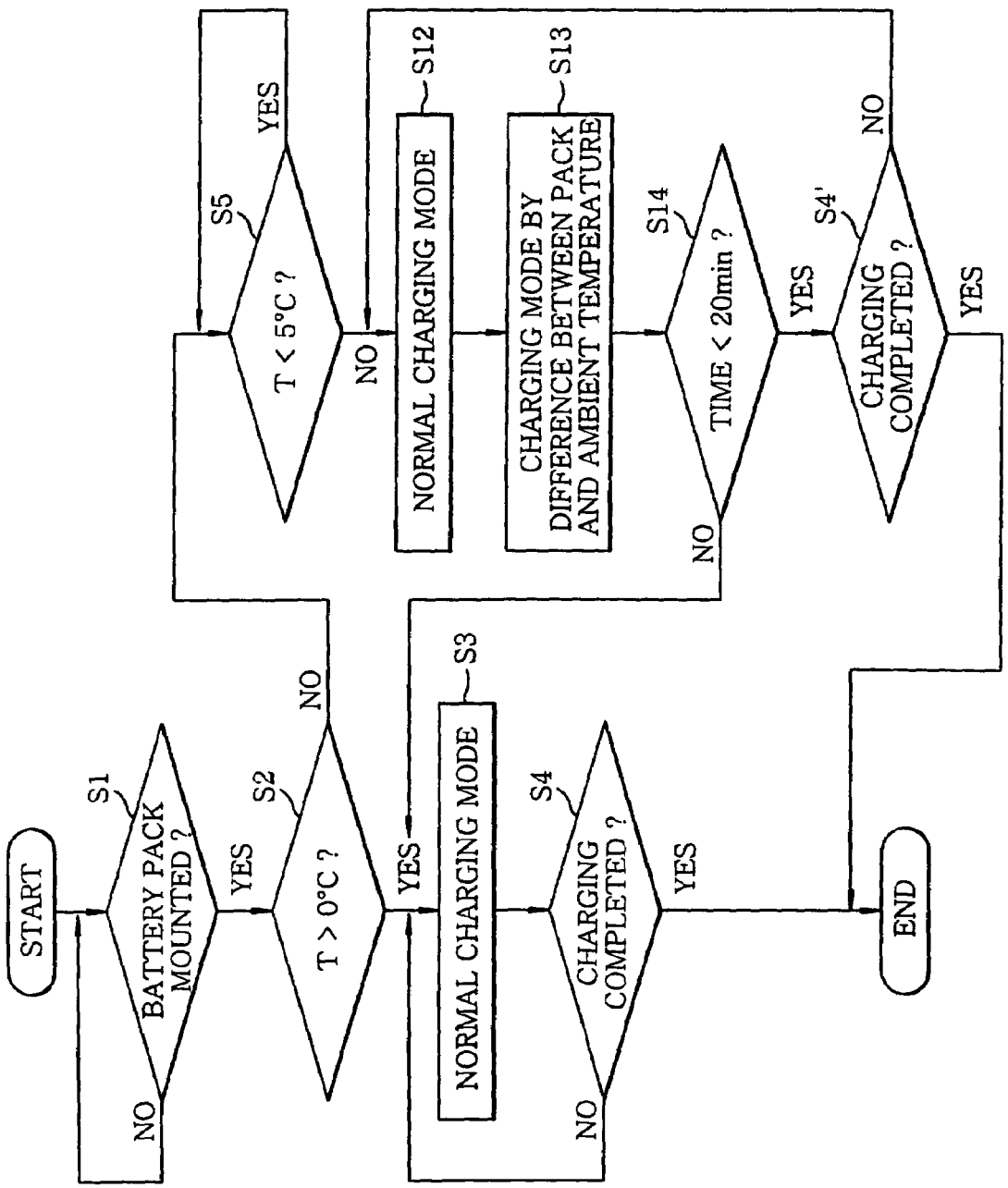
FIG. 8 offers a flowchart for explaining an operation of the charging device in accordance with the second preferred embodiment.

FIG. 8 shows a flowchart for explaining an operation of the charging device 31 configured as above. Here, operations similar to those designated in the flowchart as shown in FIG. 2 will be assigned same step numbers, and description thereof will be omitted. In the example of FIG. 8, the operation shifts to step S5 to enter into the low temperature standby mode. Then, after the ambient temperature is detected at step S12, the charging operation is performed by using the ΔT/Δt control table set by the temperature difference between the ambient temperature sensor 34 and the battery temperature sensor 4 as shown in Table 4. Thereafter, if 20 minutes have not elapsed from the beginning of the charging operation, the operation shifts to step S4' to determine whether or not the battery has been fully charged. At step S4', if the full capacity charge has been determined to be achieved, the charging operation is terminated, and if it is determined to be not achieved, the operation returns back to step S12. After the lapse of 20 minutes at step S14, the operation moves to step S3 to perform the normal charging operation by using the normal ΔT/Δt control table.

In the event that a large temperature difference exists between the ambient temperature sensor 34 and the battery temperature sensor 4, it becomes possible to more accurately judge the full capacity charge from the temperature increasing rate of the rechargeable battery corresponding to the installation environment of the charging device 31, by setting in advance a large table value capable of preventing the premature charging cessation which would otherwise occur under the influence of the ambient temperature and also by setting the table value in detail with respect to the temperature difference noted above. In addition, by regulating the time period during which the charging operation is controlled using the large table value in the second preferred embodiment, it is possible to effectively prevent any excess charge.

Third Preferred Embodiment

Figure 9:
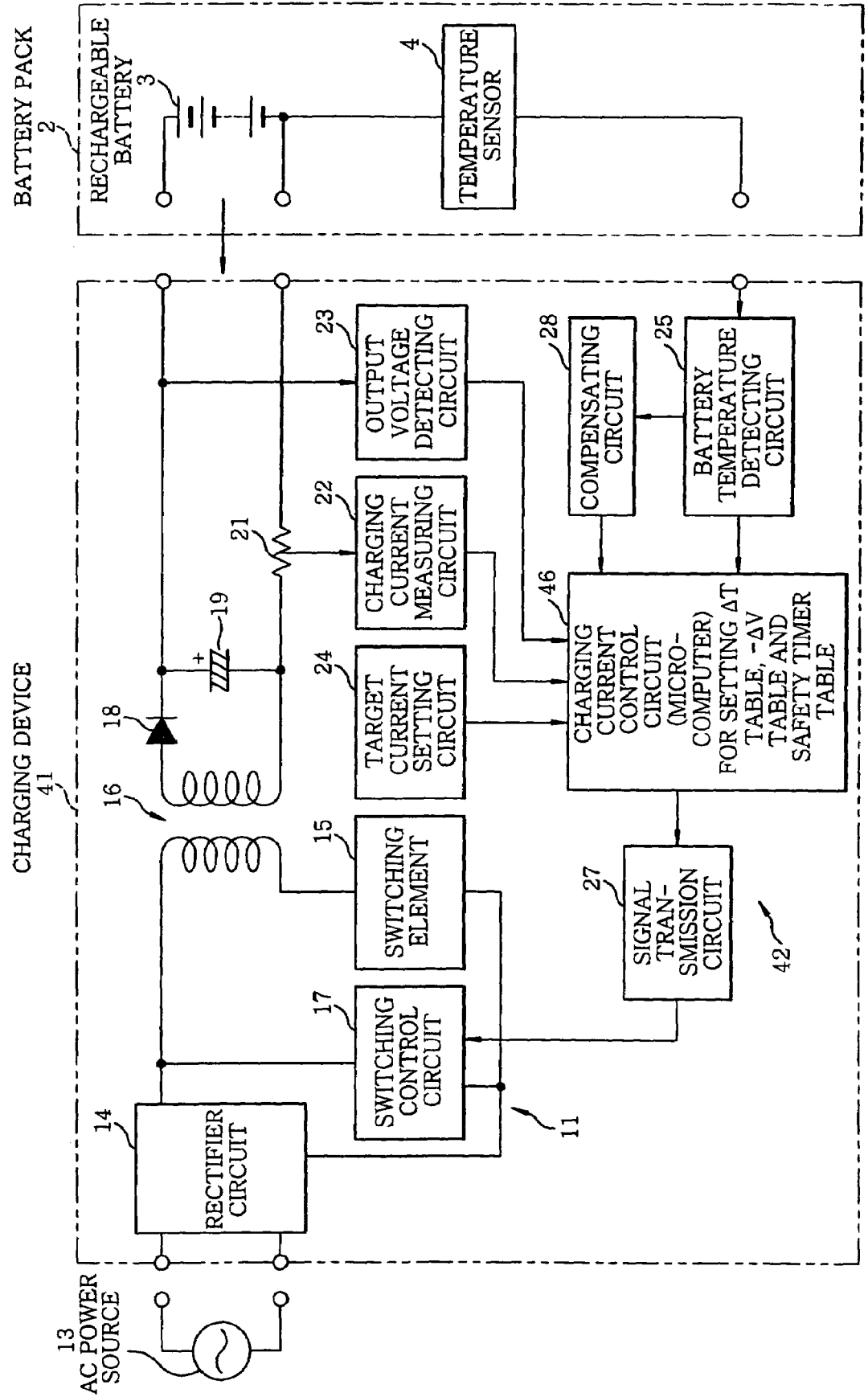
FIG. 9 provides a block diagram showing an electrical configuration of a charging device in accordance with a third preferred embodiment of the present invention.
Figure 10:
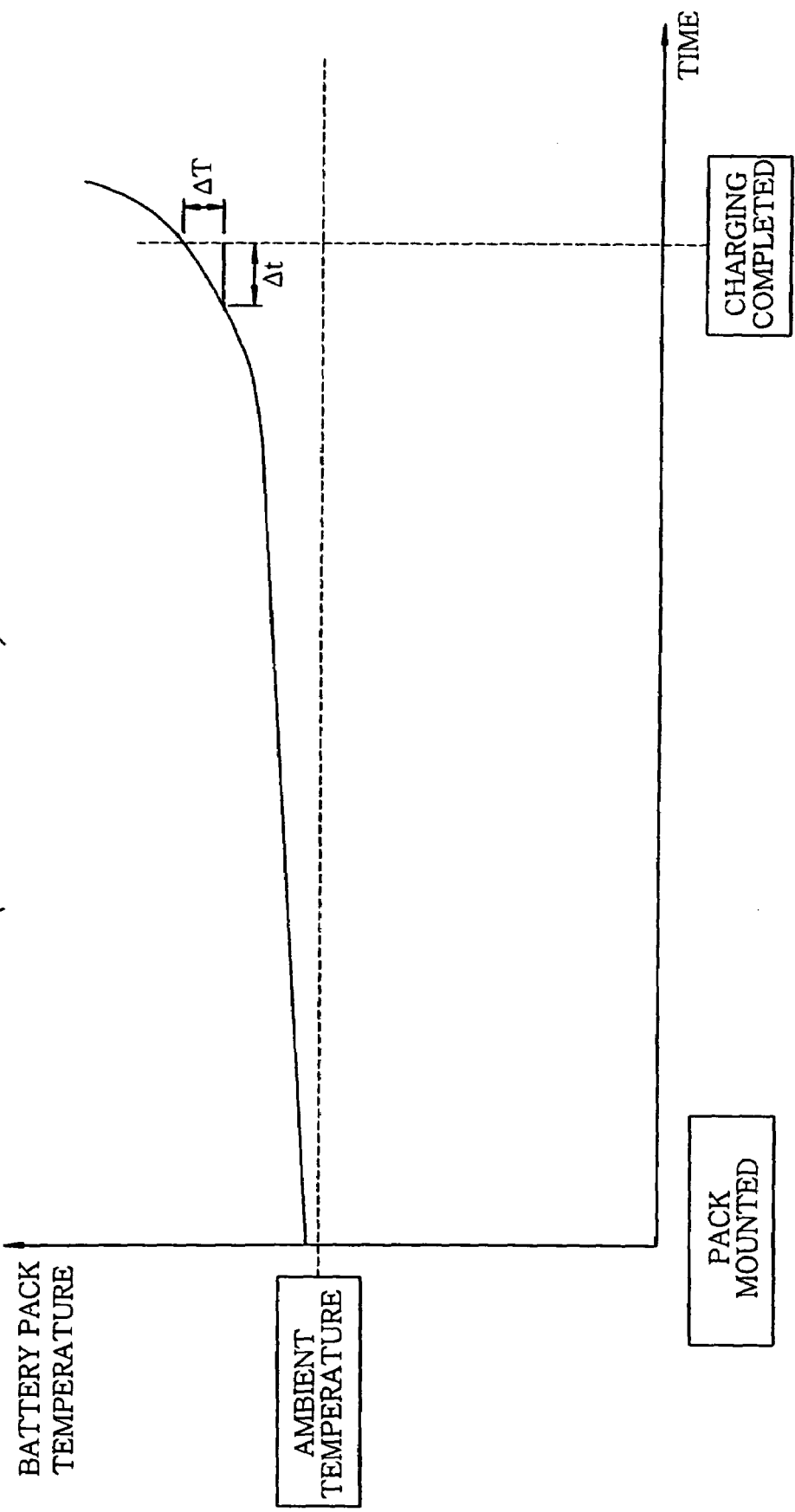
FIG. 10 shows a graph for illustrating a conventional example of the temperature variation along with a charging operation of an rechargeable battery.
Figure 11:
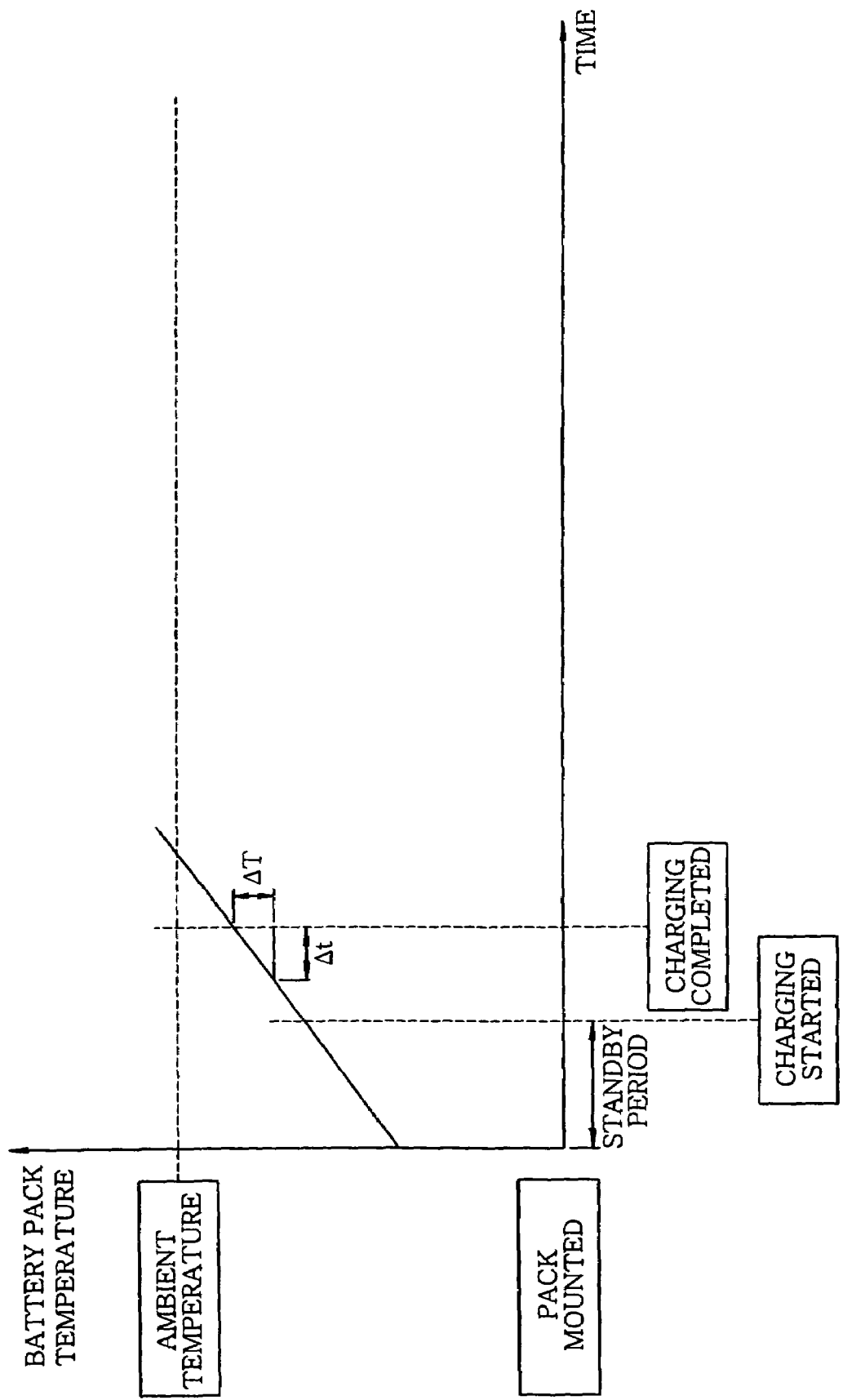
FIG. 11 illustrates a graph for explaining an operation of a conventional charging device.

FIG. 9 provides a block diagram showing an electrical configuration of a charging device 41 in accordance with a third preferred embodiment of the present invention. The charging device 41 is similar to the afore-mentioned charging device 1 illustrated in FIG. 1, and hence the parts identical to those described in FIG. 1 will be assigned same reference numerals, and description thereof will be omitted. In accordance with the third preferred embodiment, a charging current control circuit 46 of a control circuit 42 executes not only the ΔT/Δt-based overcharge control but also a −ΔV charging control or second and third charging controls governed by a safety timer.

The −ΔV charging control is performed in such a manner that the charging operation is completed when the output voltage detecting circuit 23 detects a battery current beginning to decrease once it has been fully charged. Further, the safety timer is adapted to forcedly stop the charging operation after the lapse of a predetermined time, e.g., one hour, from the commencement of the charging operation, even when the ΔT/Δt-based overcharge control and the −ΔV charging control are not executed at all.

In this way, the provision of the second and third charging control units as a fail-safe unit helps to prevent the battery from being excessively charged in more reliable manner.

As described in the foregoing, in accordance with the charging device of the present invention, the battery pack having the rechargeable battery provided with the temperature detecting unit for detecting the temperature of the rechargeable battery is independently formed of the charging device and mounted on the charging device at the time of the charging operation. In such charging device, the controller monitors the detection result of the temperature detecting unit and, from the temperature increasing rate (ΔT/Δt) at the time of the rechargeable battery approaching a full capacity charge, judges the rechargeable battery to have been fully charged, thus stopping the charging operation. During this control process, the compensating unit greatly changes the first predetermined value, namely, a threshold value for judging of the full capacity charge, if the temperature of the rechargeable battery at the time of mounting the rechargeable battery on the charging device is equal to or smaller than the second predetermined value.

Accordingly, even in the case when the rechargeable battery is relocated from a low temperature environment to a general room temperature environment and then charged under that state, it is possible to judge the success or failure of the full capacity charge, based on the temperature increasing amount involved in an intrinsic charging operation except for the temperature increasing amount due to the room temperature, thus achieving the full capacity charge in a reliable manner.

While the invention has been shown and described with respect to the preferred embodiments, it will be understood by those skilled in the art that various changes and modification may be made without departing from the scope of the invention as defined in the following claims.

What is claimed is:

1. A charging device comprising:
   a charging unit;
   a detection unit for detecting a temperature and a temperature increasing rate of a rechargeable battery;
   a controller for controlling the charging unit to supply a charging current to the rechargeable battery, wherein the charging unit stops supplying the charging current to the rechargeable battery if the temperature increasing rate is equal to or greater than a threshold rate for judging of a full capacity charge of the rechargeable battery; and
   a compensating unit for setting the threshold rate to have a first value if the temperature of the rechargeable battery when mounting the rechargeable battery on the charging device is equal to or smaller than a threshold temperature and setting the threshold rate to have a second value if the temperature of the rechargeable battery when mounting the rechargeable battery on the charging device is greater than the threshold temperature, wherein the first value is greater than the second value.

2. The charging device of claim 1, wherein the detection unit is further adapted to sense a type of the rechargeable battery, and
   wherein the compensating unit also changes the first and second values of the threshold rate according to the type of the rechargeable battery.

3. The charging device of claim 1, further comprising an ambient temperature detecting unit for detecting an ambient temperature,
   wherein the compensating unit changes the first value of the threshold rate according to the difference between the ambient temperature detected by the ambient temperature detecting unit and the temperature of the rechargeable battery detected by the detection unit.

4. The charging device of claim 2, further comprising an ambient temperature detecting unit for detecting an ambient temperature,
   wherein the compensating unit changes the first value of the threshold rate according to the difference between the ambient temperature detected by the ambient temperature detecting unit and the temperature of the rechargeable battery detected by the detection unit.

5. The charging device of claim 3, wherein the compensating unit changes the first value of the threshold rate according to the difference between the ambient temperature and the temperature of the rechargeable battery respectively detected by the ambient temperature detecting unit and the detection unit while the rechargeable battery is being charged.

6. The charging device of claim 4, wherein the compensating unit changes the first value of the threshold rate according to the difference between the ambient temperature and the temperature of the rechargeable battery respectively detected by the ambient temperature detecting unit and the detection unit while the rechargeable battery is being charged.

7. The charging device of claim 1, wherein, if the temperature of the rechargeable battery when mounting the rechargeable battery on the charging device is equal to or smaller than the threshold temperature, the controller controls the charging unit to supply no current or a current smaller than the charging current until a temperature of the rechargeable battery becomes equal to or smaller than another threshold temperature,
   wherein said another threshold temperature is greater than the threshold temperature.

* * * * *

UNITED STATES PATENT AND TRADEMARK OFFICE
CERTIFICATE OF CORRECTION

PATENT NO. : 7,592,779 B2 Page 1 of 1
APPLICATION NO. : 11/387914
DATED : September 22, 2009
INVENTOR(S) : Miwa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Twenty-first Day of September, 2010

David J. Kappos
*Director of the United States Patent and Trademark Office*